US008677253B2

(12) United States Patent (10) Patent No.: US 8,677,253 B2
Duquene et al. (45) Date of Patent: Mar. 18, 2014

(54) REPLICATING RECORDED ACTIONS ACROSS COMPUTER SYSTEMS IN A COLLABORATIVE ENVIRONMENT

(75) Inventors: Joel Duquene, Raleigh, NC (US); Morris Stanley Johnson, Jr., Cary, NC (US); Henri F. Meli, Cary, NC (US); Karline Vilme, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 12/787,017

(22) Filed: May 25, 2010

(65) Prior Publication Data

US 2011/0296303 A1 Dec. 1, 2011

(51) Int. Cl.
*G06F 3/00* (2006.01)

(52) U.S. Cl.
USPC .......................................... 715/755; 715/753

(58) Field of Classification Search
USPC .................................. 715/755, 753
See application file for complete search history.

(56) References Cited

U.S. PATENT DOCUMENTS

| 5,758,110 | A  | * | 5/1998  | Boss et al. ..................... 715/751 |
| 6,304,283 | B1 | * | 10/2001 | Kitagawa ................... 348/14.06 |
| 7,036,079 | B2 | * | 4/2006  | McGlinchey et al. ........ 715/704 |
| 7,062,497 | B2 | * | 6/2006  | Hamburg et al. ..................... 1/1 |
| 7,139,978 | B2 |   | 11/2006 | Rojewski et al. |
| 7,293,243 | B1 | * | 11/2007 | Ben-Shachar et al. ........ 715/781 |
| 7,627,821 | B2 |   | 12/2009 | Klementiev |
| 7,634,540 | B2 | * | 12/2009 | Ivashin et al. ................. 709/204 |
| 7,640,506 | B2 | * | 12/2009 | Pratley et al. ................. 715/751 |
| 7,653,896 | B2 |   | 1/2010  | Herdeg, III |
| 7,665,019 | B2 |   | 2/2010  | Jaeger |
| 2007/0005694 | A1 | * | 1/2007 | Popkin et al. ................. 709/204 |
| 2007/0174776 | A1 |   | 7/2007 | Ghattu |
| 2007/0192700 | A1 |   | 8/2007 | Sengar |
| 2008/0120553 | A1 |   | 5/2008 | Bergman et al. |
| 2009/0287643 | A1 |   | 11/2009 | Corville et al. |
| 2010/0017693 | A1 |   | 1/2010 | Keohane et al. |
| 2010/0146403 | A1 | * | 6/2010 | Stevens ......................... 715/751 |

FOREIGN PATENT DOCUMENTS

JP 2007241804 9/2007

* cited by examiner

*Primary Examiner* — Doon Chow
*Assistant Examiner* — Le Nguyen
(74) *Attorney, Agent, or Firm* — DeLizio Gilliam, PLLC

(57) ABSTRACT

A first computer system in a collaborative environment receives a plurality of indications of actions executed on content of a second computer system in the collaborative environment. A mapping between the content of the second computer system and corresponding content of the first computer system is determined. A subset of the plurality of indications of the actions executed on the content of the second computer system that are to be executed on the corresponding content of the first computer system is identified. A preview of executing the subset of the plurality of indications of the actions is presented on the first computer system. The subset of the plurality of indications of the actions is executed on the corresponding content of the first computer system.

20 Claims, 8 Drawing Sheets

US 8,677,253 B2

REPLICATING RECORDED ACTIONS ACROSS COMPUTER SYSTEMS IN A COLLABORATIVE ENVIRONMENT

BACKGROUND

Embodiments of the inventive subject matter generally relate to the field of data sharing and, more particularly, to replicating recorded actions across computer systems in a collaborative environment.

Collaborative software are used to conduct live meetings and presentations via the Internet. For example, in a web conference, a participant can attend a meeting and collaborate with other participants via the Internet. The collaborative software can be used to share presentations, applications, files, and other content. The collaborative software also allow content and presentation activity on one computer system to be recorded and to be subsequently viewed on/distributed to other computer systems.

SUMMARY

Embodiments include a method comprising receiving, at a first computer system in a collaborative environment, a plurality of indications of actions executed on content of a second computer system in the collaborative environment. A mapping between the content of the second computer system and corresponding content of the first computer system is determined. A subset of the plurality of indications of the actions executed on the content of the second computer system that are to be executed on the corresponding content of the first computer system is identified. A preview of executing the subset of the plurality of indications of the actions is presented on the first computer system. The subset of the plurality of indications of the actions is executed on the corresponding content of the first computer system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
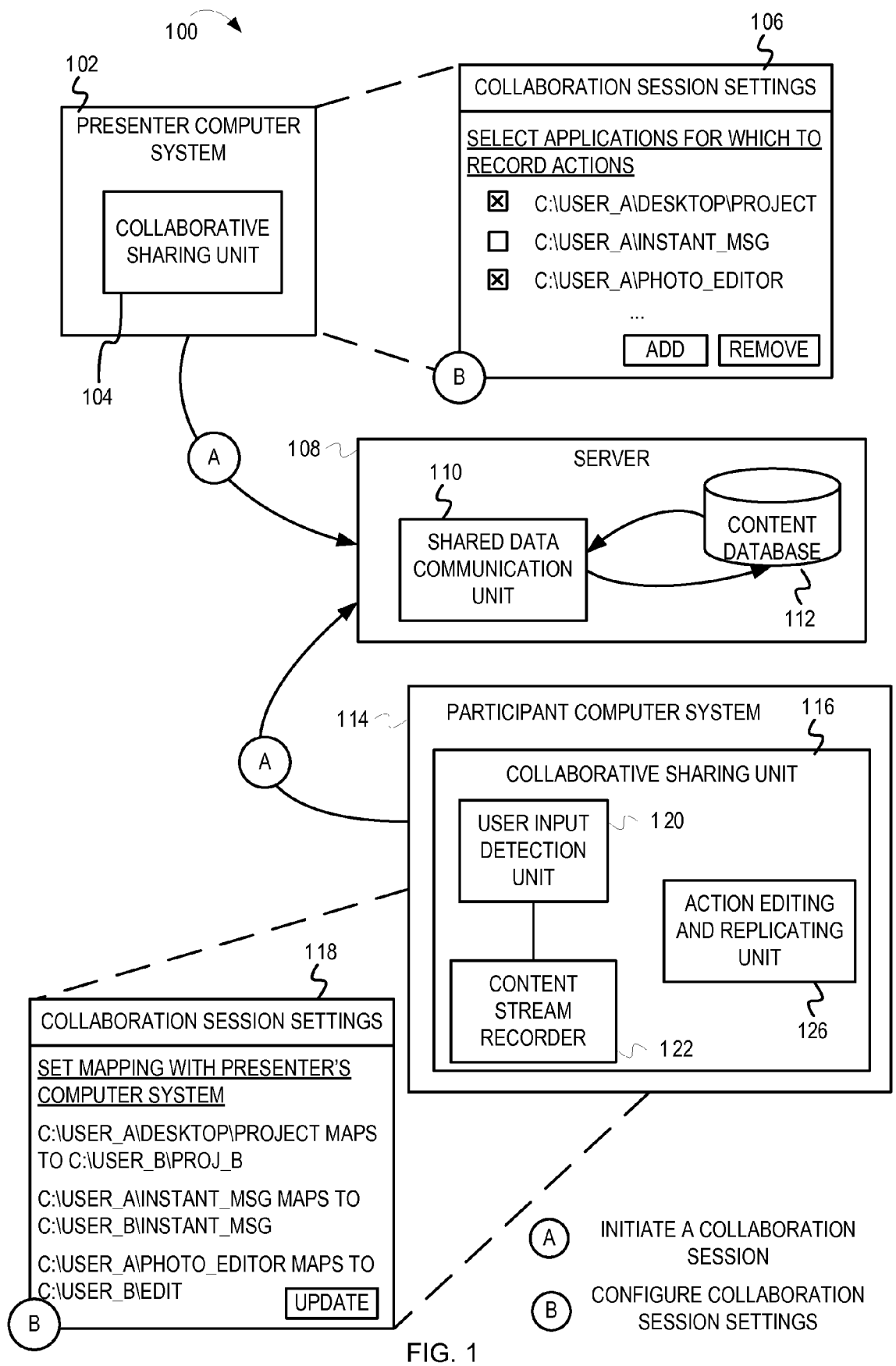
FIG. 1 depicts a conceptual diagram illustrating example operations for configuring a system to manipulate indications of actions executed in a collaborative environment.

The description that follows includes exemplary systems, methods, techniques, instruction sequences, and computer program products that embody techniques of the present inventive subject matter. However, it is understood that the described embodiments may be practiced without these specific details. For instance, although examples refer to replicating recorded actions across computer systems in a live environment, embodiments are not so limited. In some implementations, the recorded actions may be stored and may be replicated at a later date, offline, outside of a collaborative environment, etc. In other instances, well-known instruction instances, protocols, structures, and techniques have not been shown in detail in order not to obfuscate the description.

Participants in a collaborative environment are typically passive participants and are restricted to viewing content and actions executed on the content presented by a computer system designated as a presenter ("presenter computer system") in the collaborative environment. For a participant to mirror actions executed on the presenter computer system on his/her computer system ("participant computer system"), the participant identifies the actions to be executed and manually provides user inputs (e.g., types keys on a keyboard, clicks a mouse button, provides input on a touch screen, etc.) to execute the identified actions on the participant computer system. For example, a presenter working with a large set of files and directories might sort, view, package, and/or select a subset of the files. Other participants that collaborate with the presenter might want to act on the same set of files/directories on their respective computer systems. Ordinarily, the presenter might select the subset of files and communicate names of the selected files to the other participants in the collaborative environment (e.g., via phone, email, or other means of communication). However, the ability of the participants to accurately replicate the actions on their respective computer systems (e.g., select the same set of files) is contingent on the presenter accurately communicating his/her actions to the other participants in the collaborative environment and the participants accurately replicating the actions. If the subset of files changes, the presenter would need to communicate a new set of actions to be executed and/or files to be selected. This can be a very time consuming, tedious, and error-prone process depending on the number of actions executed on the presenter computer system and depending on the number of actions to be replicated on the participant computer system.

An action capturing code can be executed on the presenter computer system for capturing indications of presenter actions executed on the presenter computer system and for providing the captured indications of the presenter actions to the participant computer system. In addition to the captured indications of the presenter actions, content presented by the presenter computer system (e.g., audio, video, applications, results of executing the actions, etc.) can also be streamed to the participant computer system. An action replication code can be executed on the participant computer system to allow the participant to edit the indications of the presenter actions and to select a subset of the indications of the presenter actions to be replicated on the participant computer system. Results of executing the subset of the indications of the presenter actions can be previewed before executing the subset of the indications of the presenter actions on corresponding content of the participant computer system. Such action capturing and action replication can simplify operations for manipulating similar content across multiple computer systems in a collaborative environment.

FIG. 1 depicts a conceptual diagram illustrating example operations for configuring a system to manipulate indications of actions executed in a collaborative environment 100. FIG. 1 depicts a computer system 102, a server 108, and a computer system 114 in the collaborative environment 100. The computer systems 102 and 104 comprise a collaborative sharing unit 104 and a collaborative sharing unit 116 respectively. The collaborative sharing unit 116 comprises a user input detection unit 120 coupled with a content stream recorder 122. The collaborative sharing unit 116 also comprises an action editing and replicating unit 126. The collaborative sharing unit 104 also comprises a user input detection unit, a content stream recorder, and an action editing and replicating unit configured as depicted in the collaborative sharing unit 116. The server 108 comprises a shared data communication unit 110 coupled with the content database 112.

At stage A, a user at the computer system 102 and a user at the computer system 114 initiate a collaboration session. The collaboration session may be initiated by clicking on a graphical user interface (GUI) object (e.g., an icon), typing a command at a command line interface, speaking a voice command, etc. For example, the user at the computer system 102 launches an application that comprises the collaborative sharing unit 104 to initiate the collaboration session. The collaborative sharing unit 104 generates a request to join the collaboration session and transmits the request to the computer system 114 via the server 108. The user at the computer system 102 takes control of the collaboration session to present content. The server 108 keeps track of a number of and device identifiers of participants in the collaboration session. The server 108 also determines that the computer system 102 is designated as a presenter ("presenter computer system") in the collaborative environment 100 and that the computer system 114 is designated as a participant ("participant computer system"). The server 108 also implements functionality to facilitate content sharing and collaboration between the presenter computer system 102 and the participant computer system 114 as will be described in FIG. 2.

Figure 2:
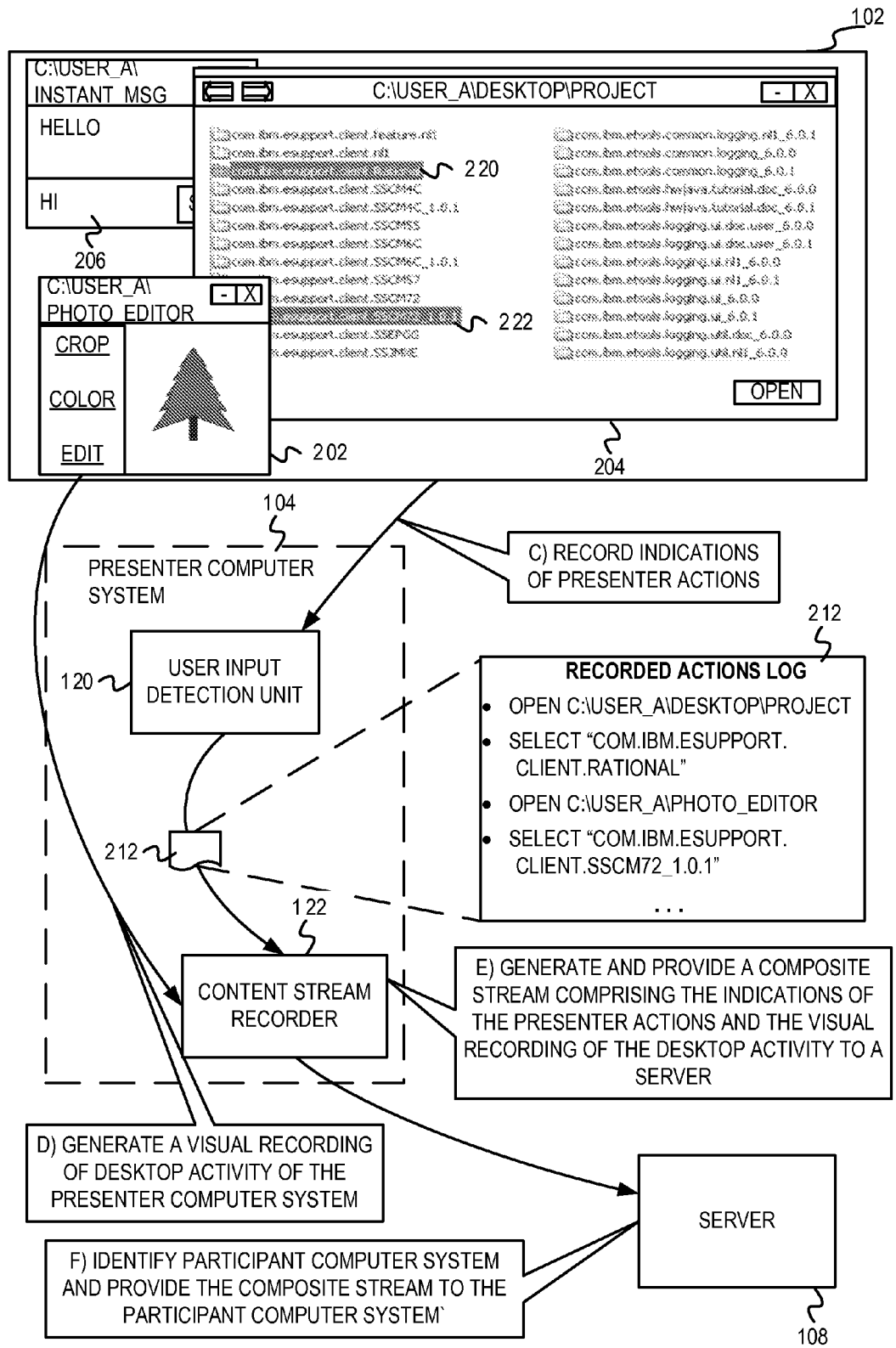
FIG. 2 depicts a conceptual diagram illustrating example operations for recording user actions.

At stage B, after the collaboration session is initiated, the users at the computer systems 102 and 114 configure collaboration session settings. As depicted in FIG. 1, the user at the presenter computer system 102 ("the presenter") configures collaboration session settings 106. Via the collaboration session settings 106, the presenter selects applications for which actions should be recorded and should be provided to other participants of the collaboration session. The presenter can choose to record actions executed on all or a subset of the applications presented by the presenter computer system 102. Referring to FIG. 2, the presenter computer system 102 presents three types of content—a project folder 204, a photo editing application 202, and an instant messaging application 206. It is noted that content can refer to applications, files, folders, etc. Referring back to FIG. 1, the presenter configures the collaboration session settings 106 so that actions executed on the project folder 204 and the photo editing application 202 are recorded as indicated by marked checkboxes, while actions executed on the instant messaging application 206 are not recorded as indicated by an unmarked checkbox.

At stage B, the user at the participant computer system 114 ("the participant") configures collaboration session settings 118. Via the collaboration session settings 118, the participant indicates a mapping between content (e.g., applications, files, folders, etc.) of the participant computer system 114 and corresponding content of the presenter computer system 102. The ability to replicate, on the participant computer system 114, the actions executed on the presenter computer system 102 is contingent on the availability of the same content on both the presenter computer system 102 and the participant computer system 114. By establishing a mapping between content of the presenter computer system 102 and corresponding content of the participant computer system 114, the collaborative sharing unit 116 replicates the actions originally executed on the presenter computer system 102. As depicted in FIG. 1, the participant determines and manually configures the mapping between content of the presenter computer system 102 and corresponding content of the participant computer system 114. In other implementations, the collaborative sharing unit 116 may implement functionality to search the participant computer system 114 and/or connected storage devices and to identify the mapping between content of the presenter computer system 102 and corresponding content of the participant computer system 114. The collaborative sharing unit 116 may determine a property (e.g., a file name) of the content of the presenter computer system 102 and identify the corresponding content of the participant computer system 114 with the same property as that of the content of the presenter computer system 102. For example, based on knowledge of filenames of files within a project folder of the presenter computer system 102, the collaborative sharing unit 116 may search the participant computer system 114 and locate files with the same filenames on the participant computer system 114. Accordingly, the collaborative sharing unit 116 can indicate a mapping between a location of the files of the presenter computer system 102 and a location of the corresponding files of the participant computer system 114. It is noted, however, that the properties of the content are not limited to filenames. Other properties such as content type, date on which the content was created/modified, content size, tags associated with the content, etc. may also be compared to determine the mapping between the content of the presenter computer system 102 and the corresponding content of the participant computer system 114. After the collaboration session settings 106 and 118 are configured, indications of actions executed on content of the presenter computer system 102 ("presenter actions") are recorded and are provided to the participant computer system 114 as will be described by stages C-F in FIG. 2.

At stage C, the user input detection unit 120 of the presenter computer system 104 records indications of the presenter actions in accordance with the collaboration session settings 106. The user input detection unit 120 monitors and detects presenter actions including keyboard key presses, mouse clicks, movement of the mouse around a desktop of the presenter computer system 102, selection by a light pen, stylus, a finger on a touch screen, a voice input, etc. Accordingly, the user input detection unit 120 generates a recorded actions log 212 that includes the indications of the presenter actions. An indication of a presenter action may be an event that is generated in response to the presenter action. For example, the presenter may use a mouse to click on an icon in an application. Accordingly, the application may generate an event (e.g., an operating system call) and indicate via parameters of the event that a mouse click was detected on the icon. The event may also comprise an identifier of the application, an identifier of the icon, etc. In one implementation, the user input detection unit 120 may initially record all the indications of the presenter actions executed on content presented by the presenter computer system 102. The user input detection unit 120 may then identify the indications of the presenter actions that are associated with the content for which the actions should be recorded (as indicated by the collaboration session settings 106). Accordingly, the user input detection unit 120 may modify the recorded actions log 212 so that the recorded actions log 212 only comprises the indications of the presenter actions that are associated with the content for which the actions should be recorded. In another implementation, the user input detection unit 120 may only record the indications of the presenter actions that are associated with the content for which the actions should be recorded as indicated by the collaboration session settings 106. As depicted in FIG. 2, the recorded actions log 212 indicates applications that are launched, files that are selected, etc. It is noted that the recorded actions log 212 of FIG. 2 depicts the indications of the presenter actions as plaintext English statements for simplicity. The recorded actions log 212 may represent the indications of the presenter actions as a sequence of commands, instructions, operating system calls, etc. The user input detection unit 120 provides the recorded actions log 212 to the content stream recorder 122 of the presenter computer system 104.

At stage D, the content stream recorder 122 of the presenter computer system 104 generates a visual recording of activity on a desktop of the presenter computer system 102 ("visual recording of the desktop activity"). The visual recording of the desktop activity comprises a sequence of frames that depict live or streaming video, audio, applications, files, other content presented by the presenter computer system 102, actions executed on the content presented by the presenter computer system 102, etc. In some implementations, the content stream recorder 122 may not record desktop activity associated with content for which it is determined that associated actions should not be recorded. For example, because the collaboration session settings 106 indicate that actions executed on the instant messaging application 206 should not be recorded, the content stream recorder 122 does not record desktop activity (e.g., received instant messages, sent instant messages, etc.) associated with the instant messaging application 206. In other words, the content stream recorder 122 does not generate frames of the visual recording of the desktop activity when the instant messaging application 206 is in the foreground and/or when actions are being executed on the instant messaging application 206. In another implementation, the presenter may specify different collaboration session settings for generating the visual recording of the desktop activity and for recording indications of the presenter actions. For example, although the collaboration session settings 106 indicate that indications of the presenter actions associated with the instant messaging application 206 should not be recorded, the content stream recorder 122 generates the visual recording of the desktop activity (e.g., messages sent and received, position of the instant messaging application on a desktop, etc.) depicting the presenter's interaction with the instant messaging application 206.

At stage E, the content stream recorder 122 generates a composite stream comprising the indications of the presenter actions and the visual recording of the desktop activity. The content stream recorder 122 multiplexes the visual recording of the desktop activity and the indications of the presenter actions to generate the composite stream. The content stream recorder 122 provides the composite stream to the server 108. The server 108, in turn, provides the composite stream to the participant computer system 114.

At stage F, the shared data communication unit 110 of the server 108 identifies the participant computer system 114 and provides the composite stream to the participant computer system 114. In some implementations, the shared data communication unit 110 stores the visual recording of the desktop activity and/or the indications of the participant actions in the content database 112. As depicted by participant computer system 114B in FIG. 3, on receiving the composite stream, the collaborative sharing unit 116 of the participant computer system 114 presents the visual recording of the desktop activity on the participant computer system 114B. It is noted that the participant computer system 114B represents a state of the participant computer system 114 (of FIG. 1) after the visual recording of the desktop activity is provided by the presenter computer system 102. As depicted by the participant computer system 114B, the collaborative sharing unit 116 presents window 304 depicting the visual recording of the desktop activity presented by the presenter computer system 102. The collaborative sharing unit 116 also presents an "edit actions" button 306 that enables the participant to indicate whether some or all of the indications of the presenter actions should be replicated on the participant computer system 114B.

Figure 3:
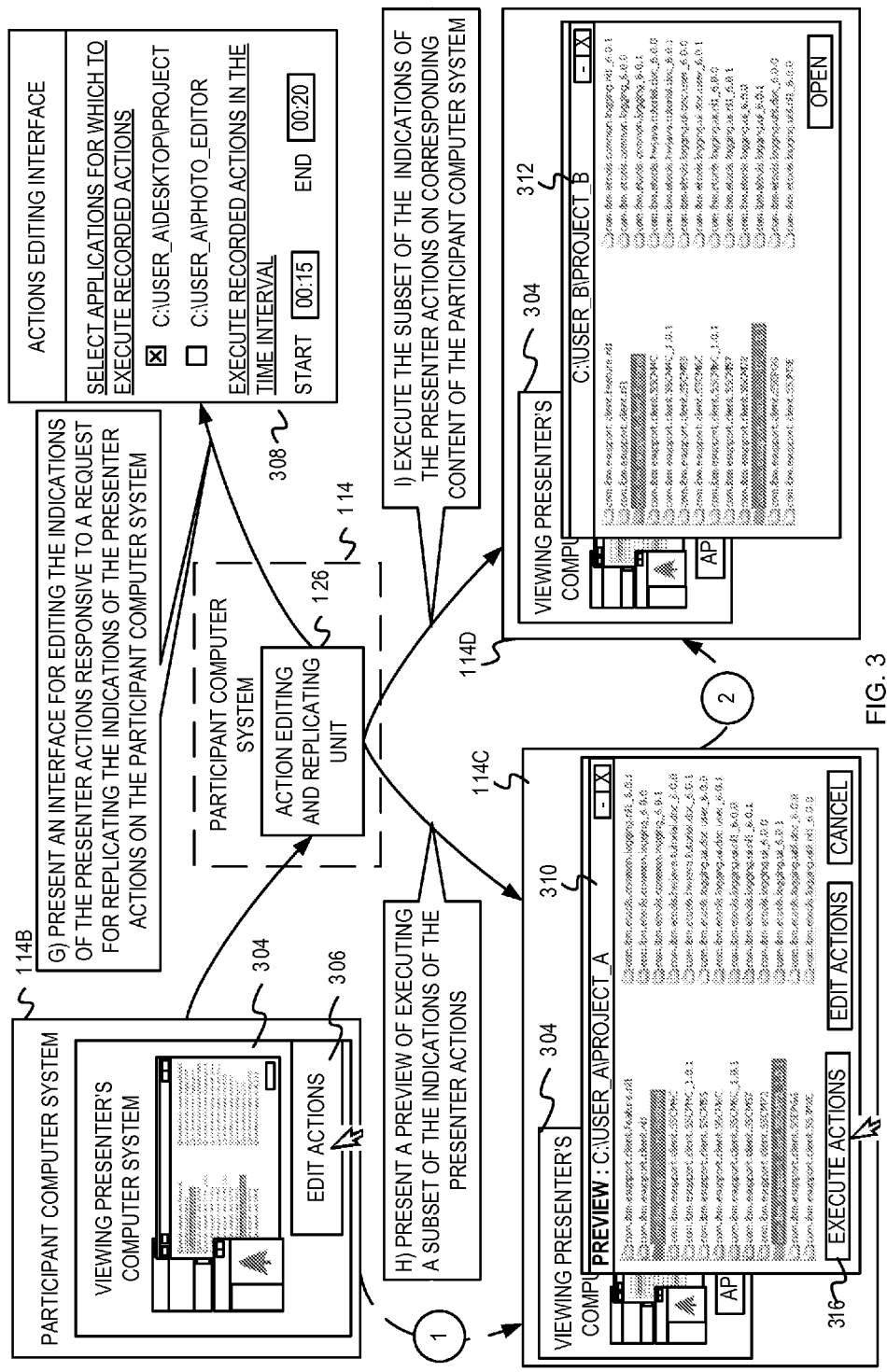
FIG. 3 depicts a conceptual diagram illustrating example operations for replicating recorded user actions.

At stage G in FIG. 3, the action editing and replicating unit 126 of the participant computer system 114 presents an interface 308 for editing the indications of the presenter actions responsive to a request for replicating the indications of the presenter actions on the participant computer system 114B. In FIG. 3, responsive to the participant clicking on the "edit actions" button 306, the action editing and replicating unit 126 presents the actions editing interface 308 for editing the indications of the presenter actions. The actions editing interface 308 presents a list of content for which the indications of the presenter actions are available. In one implementation, the action editing and replicating unit 126 can identify the content for which the indications of the presenter actions are available (e.g., based on analyzing the recorded actions log 212). In another implementation, the action editing and replicating unit 126 may receive a notification of the collaboration session settings 106 (configured by the presenter) that indicate the content for which the indications of the presenter actions are provided to the participant computer system 114B. As depicted by the actions editing interface 308, the indications of the presenter actions associated with the project folder 204 and the photo editing application 202 are available for replication on the participant computer system 114B. The participant can select the indications of the presenter actions that are to be replicated on the participant computer system 114B by selecting content for which to execute the indications of the presenter actions. In FIG. 3, the participant indicates that only the indications of the presenter actions associated with the project folder 204 should be replicated. Additionally, the participant can select the subset of the indications of the presenter actions that are to be replicated on the participant computer system 114B by selecting a time interval during which to execute the indications of the presenter actions. As depicted by the actions editing interface 308, the participant indicates that the indications of the presenter actions during a 5-minute time interval starting at 15 minutes and ending at 20 minutes (from the start of recording the indications of the presenter actions) should be replicated on the participant computer system 114B. Thus, the action editing and replicating unit 126 selects, for replication on the participant computer system 114B, any indications of the presenter actions associated with the project folder 204 and within the specified 5-minute time interval.

At stage H, the action editing and replicating unit 126 presents a preview 310 of executing the subset of the indications of the presenter actions on participant computer system 114C. The participant computer system 114C is the state of the participant computer system 114B after the participant edits the indications of the presenter actions on the actions editing interface 308. A dashed line denoted by "1" represents the transition between the participant computer system 114B and the participant computer system 114C. The action editing and replicating unit 126 generates the preview 310 of executing the subset of the indications of the presenter actions based on knowledge of the content for which the indications of the actions should be replicated (as indicated by the participant on the actions editing interface 308). The preview 310 can represent a set of frames that are associated with the subset of the indications of the presenter actions to be executed on the participant computer system 114C. The action editing and replicating unit 126 identifies the frame(s) of the visual recording of the desktop activity that are associated with the subset of the indications of the presenter actions. In one implementation, each frame of the visual recording of the desktop activity may be tagged to indicate applications/files that are in the foreground (i.e., applications/files on which actions are being executed) in the corresponding frame of the received content stream. In another implementation, metadata associated with the visual recording of the desktop activity may indicate frames in which a particular application/file is in the foreground or on which actions are being executed. For example, the metadata may indicate that the presenter executes actions on the project folder 204 in frames 5-20 and that the presenter executes actions on the instant messaging application 206 in frames 21-50. Thus, based on determining that only the indications of the presenter actions associated with the project folder 204 are to be replicated on the participant computer system 114C, the action editing and replicating unit 126 can select and present frames 5-20 as the preview 310 of executing the subset of the indications of the presenter actions. Although not depicted in FIG. 3, it is noted that the action editing and replicating unit 126 may not edit the frames of the visual recording of the desktop activity and may not remove applications or other content that are part of the frames. For example, although the participant indicates that only the indications of the presenter actions associated with the project folder 204 should be replicated on the participant computer system, the preview 310 may also depict the other applications (e.g., the instant messaging application 206, the photo editing application 202, etc.) in the frames that depict the project folder 204 in the foreground. Additionally, as depicted by the participant computer system 114C, the collaborative sharing unit 116 continues to present the window 304 depicting streaming content from the presenter computer system 102. After viewing the preview 310 of executing the subset of the indications of the presenter actions, the participant clicks an "execute actions" button 316 of the preview window 310 to indicate that the subset of the indications of the presenter actions should be replicated on corresponding content of the participant computer system 114C. Alternately, the participant can further edit the indications of the presenter actions, select a different subset of the indications of the presenter actions for replication, or cancel operations to replicate the indications of the presenter actions on the participant computer system 114C.

At stage I, the action editing and replicating unit 126 executes the subset of the indications of the presenter actions on corresponding content of participant computer system 114D. The participant computer system 114D is the state of the participant computer system 114C after the participant indicates that the subset of the indications of the presenter actions should be executed on the participant computer system 114C. A dashed line denoted by "2" represents the transition between the participant computer system 114C and the participant computer system 114D. Based on the mapping between the content of the presenter computer system 102 and the corresponding content of the participant computer system 114D (as indicated by the collaboration session settings 118 in FIG. 1), the action editing and replicating unit 126 identifies the corresponding content of the participant computer system 114D on which the subset of the indications of the presenter actions should execute. Based on the collaboration session settings 118 in FIG. 1, the action editing and replicating unit 126 determines that content identified by C:\user_A\project A on the presenter computer system 102 corresponds to content identified by C:\user_B\project_B on the participant computer system 114D. The action editing and replicating unit 126 generates system calls to an operating system of the participant computer system 114D (e.g., to launch the appropriate content, to execute actions, etc.). The action editing and replicating unit 126 provides the system calls to the operating system to execute the subset of the indications of the presenter actions on the appropriate content of the participant computer system 114D. As depicted in FIG. 3, in accordance with the recorded actions log 212 and options selected by the participant on the actions editing interface 308, the action editing and replicating unit 126 causes project folder 312 identified by C:\user_B\project_B to be opened on the participant computer system 114D and appropriate files within the project folder 312 to be selected. Additionally, as depicted by the participant computer system 114D, the collaborative sharing unit 116 continues to present the window 304 depicting streaming content from the presenter computer system 102.

It is noted that although FIGS. 1-3 depict the mapping between content of the presenter computer system 102 and the corresponding content of the participant computer system 114 being established during configuration of the collaboration session, embodiments are not so limited. In some implementations, the mapping between the content of the presenter computer system 102 and the corresponding content of the participant computer system 114 may be established A) after the presenter indicates content for which indications of the presenter actions should be recorded, B) after the participant indicates that the indications of the presenter actions should be replicated on the participant computer system 114, C) after the participant identifies a subset of the indications of the presenter actions should be replicated on the participant computer system 114, and/or D) at any suitable time as determined by the participant. Although FIG. 1 depicts the mapping between the presenter computer system 102 and the participant computer system 114 being established for all content presented by the presenter computer system 102, embodiments are not so limited. In some implementations, the presenter may only be prompted to indicate a mapping (or a mapping may be automatically determined) between the content for which indications of the presenter actions should be recorded (as determined from the collaboration session settings 106 indicated by the presenter) and corresponding content of the participant computer system 114.

It is noted that if the mapping between the content of the presenter computer system 102 and the corresponding content of the participant computer system 114 cannot be determined (e.g., because the corresponding content cannot be found on the participant computer system 114), the collaborative sharing unit 116 may present an error notification. Indications of the presenter actions associated with content that cannot be identified on the participant computer system 114 may not be replicated on the participant computer system 114. It should also be noted that the participant may view content presented by the presenter computer system 102 without indicating a mapping between the content of the presenter computer system 102 and the corresponding content of the participant computer system 114. In other words, if a particular application presented by the presenter computer system 102 is not available (e.g., cannot be found, is not installed, etc.) on the participant computer system 114, the participant will be able to view the application as presented by the presenter computer system 102. However, the participant will not be able to mirror actions executed on the application on the participant computer system 114.

It is also noted that in some implementations, a composite stream comprising the visual recording of the desktop activity and the indications of the presenter actions may not be provided to the participant computer system 114. Instead, the collaborative sharing unit 104 of the presenter computer system 102 may generate two streams—one comprising a visual recording of activity on a desktop of the presenter computer system 102 and another comprising the recorded presenter actions. The collaborative sharing unit 104 may continuously stream, via the shared data communication unit 110 of the server 108, the visual recording of the desktop activity to the participant computer system 114. The shared data communication unit 110 may provide the indications of the presenter actions to the participant computer system 114 only on receiving a request from the participant computer system 114 for some/all of the indications of the presenter actions.

Figure 4:
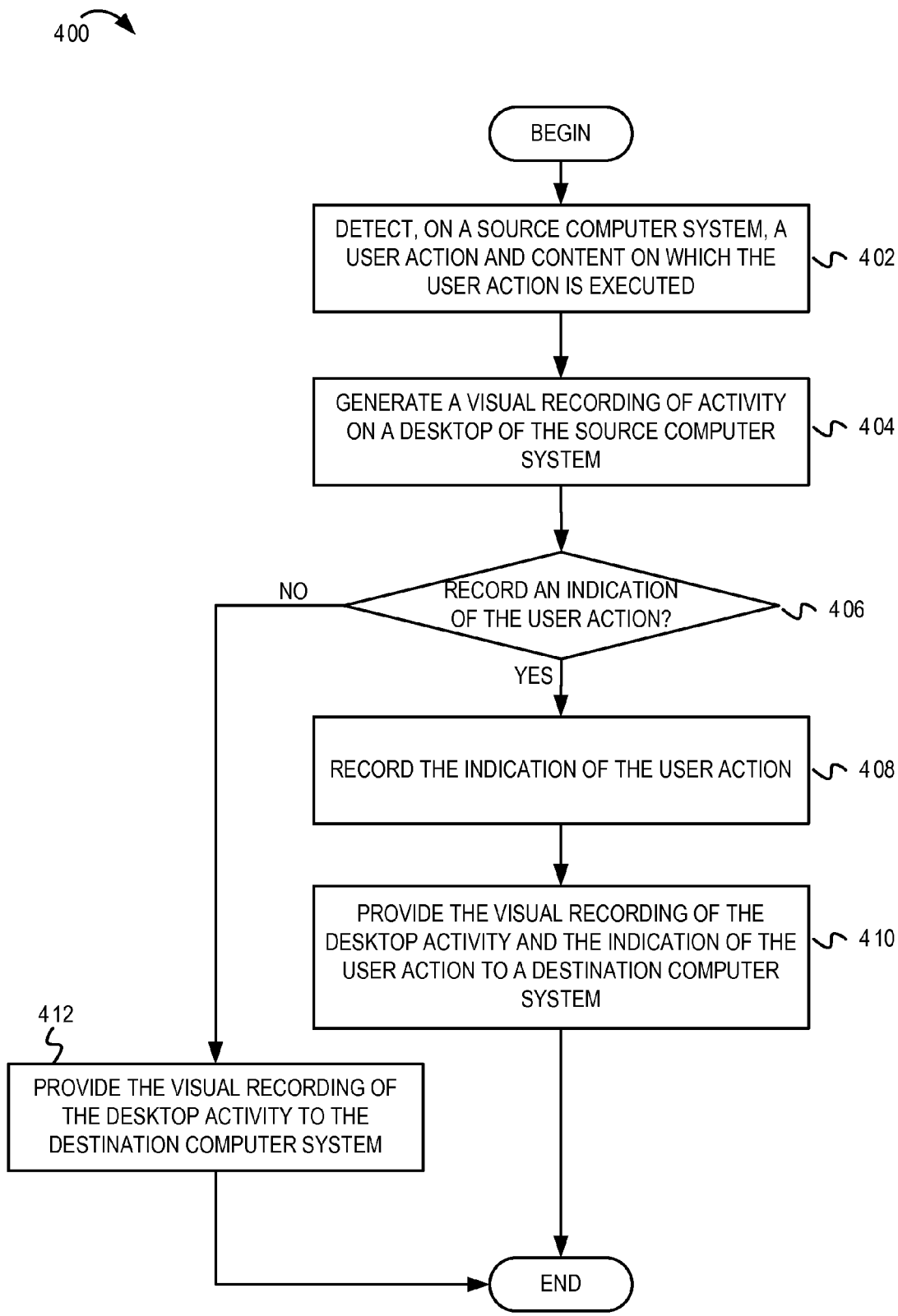
FIG. 4 is a flow diagram illustrating example operations for recording indications of user actions at a source computer system.

FIG. 4 is a flow diagram illustrating example operations for recording indications of user actions at a source computer system. Flow 400 begins at block 402.

A user action and content on which the user action is executed are detected on a source computer system (block 402). Various techniques can be implemented to detect the user action on the source computer system. For example, the user action may be detected by an application on which the user action is executed. As another example, the user action may be detected by a background process or daemon configured to detect the user action. Some examples of user actions that may be detected include mouse clicks, movement of a mouse pointer, keyboard key presses, voice commands, selections by a light pen, a finger, or a stylus on a touch screen, etc. The flow continues at block 404.

A visual recording of activity on a desktop of the source computer system ("visual recording of the desktop activity") is generated (block 404). The visual recording of the desktop activity may comprise a sequence of frames each of which can depict results of executing the user actions (e.g., opening files, selecting graphical user interface objects, etc.), an audio stream (e.g., a presenter describing presented content), multimedia content, etc. Metadata associated with the frames and/or metadata associated with the visual recording of the desktop activity may indicate content that are in the foreground (e.g., content on which actions are being executed) in the corresponding frame. It is noted that the content can refer to applications, files, folders, etc. In some implementations, based on user-configured settings, the visual recording of the desktop activity may be generated by recording desktop activity of the source computer system during a predefined interval of time, when actions are being executed on a predefined set of applications, etc. The flow continues at block 406.

It is determined whether an indication of the user action should be recorded (block 406). During initial configuration of a collaboration session, a user at the source computer system (e.g., a presenter) may have an option of indicating which actions should be recorded and provided to other participants in the collaboration session. For example, a time interval during which the indication of the user actions should be recorded may be specified. Accordingly, the indication of the user actions within the specified time interval may be recorded after verifying that the specified time interval has not elapsed. As another example, content for which indication of the actions should be recorded may be specified. On detecting the user action, the application on which the user action executes may be identified and it may be determined whether the indication of the user action should be recorded. If it is determined that the indication of the user action should be recorded, the flow continues at block 408. Otherwise, the flow continues at block 412.

The visual recording of the desktop activity is provided to a destination computer system (block 412). The flow 400 moves from block 406 to block 412 if it is determined that the indication of the user action should not be recorded. In some implementations, the visual recording of the desktop activity may be provided to a server. The server may store the visual recording of the desktop activity for future use. The server may also identify the destination computer system by determining whether other computer systems have registered to receive the visual recording of the desktop activity, whether there exist other computer systems in the collaborative environment, etc. Accordingly, the server can provide the visual recording of the desktop activity to the destination computer system. From block 412, the flow ends.

The indication of the user action is recorded (block 408). The flow 400 moves from block 406 to block 408 if it is determined that the indication of the user action should be recorded. The indication of the user action may be recorded in a recorded actions log as an operating system call or as a set of instructions. In some implementations, the indication of the user action may be recorded as plaintext English statements and a process on the destination computer system may interpret and convert the plaintext English statements into appropriate system calls. In addition to the indication of the user action, content on which the user action was executed, a time instant at which the user action was executed, etc. may also be recorded. In some implementations, a frame of the visual recording of the desktop activity that depicts the user action being executed may also be recorded. For example, the recorded actions log may comprise an operating system call that indicates a mouse click on a word processing application, may indicate a location and a version number of the word processing application, and that the mouse click was depicted in frame 10 of the visual recording of the desktop activity. The flow continues at block 410.

The visual recording of the desktop activity and the indication of the user action are provided to the destination computer system (block 410). In some implementations, a composite stream comprising the indication of the user action and the visual recording of the desktop activity may be generated. The composite stream may be generated by multiplexing the visual recording of the desktop activity and a stream comprising the indication of the user action. The composite stream may be provided to the destination computer system. In another implementation, two separate streams—one comprising the visual recording of the desktop activity and another comprising the indications of the user action may be provided to the destination computer system. In some implementations, the visual recording of the desktop activity and the indication of the user action may also be stored on the server. From block 410, the flow ends.

It is noted that although not depicted in FIG. 4, in one implementation, indications of all the user actions executed on the content presented by the source computer system may be recorded. After the indications of all the user actions are recorded, content for which the indications of the user actions should be provided to the destination computer system (as indicated by the collaboration session settings 106) may be identified. The recorded actions log may be edited and a subset of the indications of the user actions that execute on content as indicated by the collaboration session settings 106 may be provided to the destination computer system. In another implementation (as described in FIG. 4), only the indications of the user actions that are associated with the content for which the actions should be recorded (as indicated by the collaboration session settings 106) may be recorded in the recorded actions log.

Figure 5:
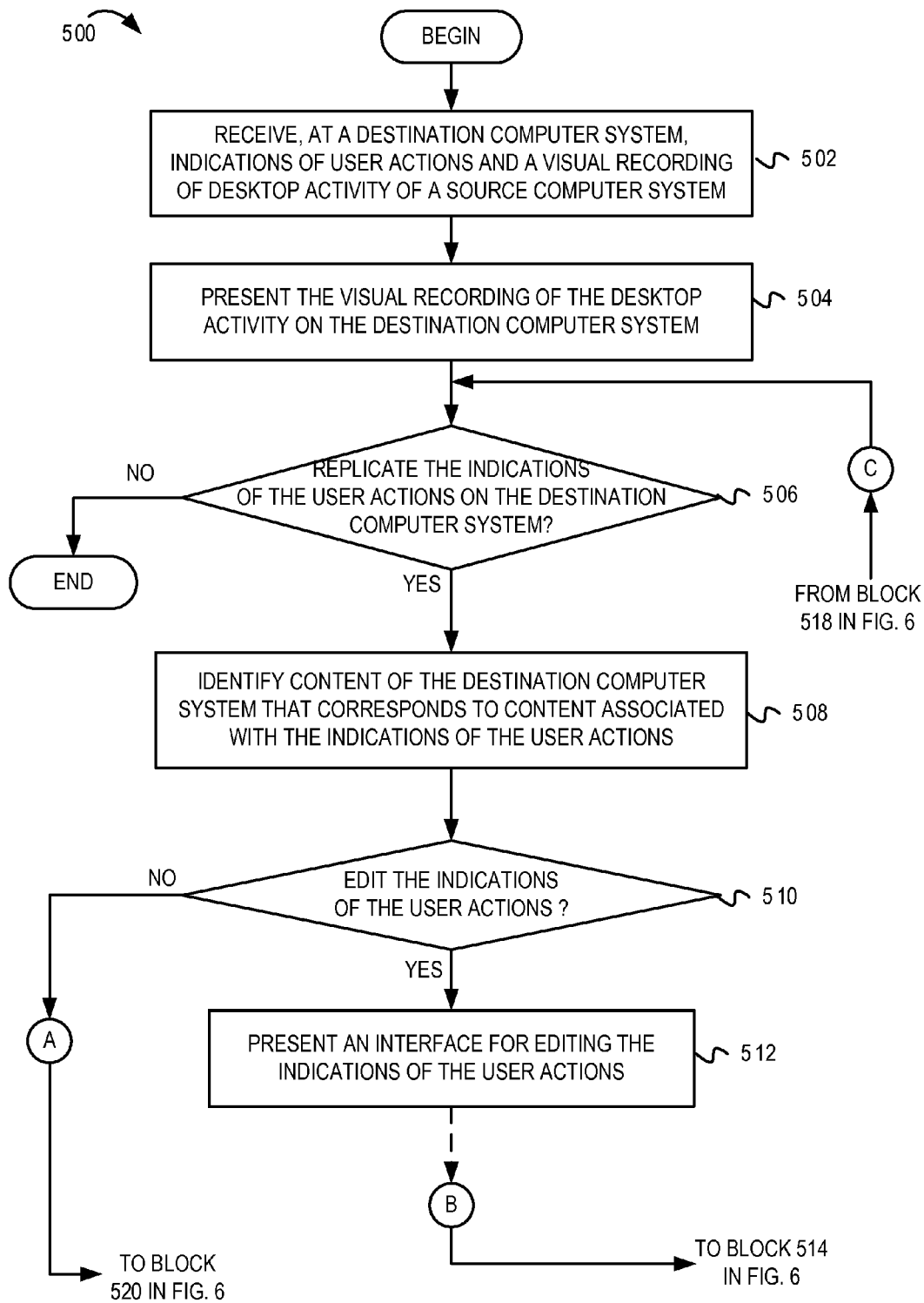
FIG. 5 illustrates a flow diagram illustrating example operations for replicating previously recorded user actions on a computer system.

FIG. 5 is a flow diagram illustrating example operations for replicating previously recorded user actions on a computer system. Flow 500 begins at block 502 in FIG. 5.

Indications of user actions and a visual recording of desktop activity of a source computer system are received at a destination computer system (block 502). The indications of the user actions and the visual recording of the desktop activity may be received either from the source computer system or from a server. In one implementation, the source computer system and the destination computer system may be part of a collaborative environment. The source computer system may present the visual recording of the desktop activity that is viewed by at least the destination computer system. Additionally, the source computer system may also record and provide indications of the user actions executed on content of the source computer system to enable replication of the same user actions on the destination computer system. In one implementation, the destination computer system may receive a composite stream comprising the indications of the user actions and the visual recording of the desktop activity. In another implementation, the destination computer system may receive two separate streams—one comprising the indications of the user actions and another comprising the visual recording of the desktop activity. The flow continues at block 504.

The visual recording of the desktop activity is presented on the destination computer system (block 504). The visual recording of the desktop activity can be streaming media (e.g., audio, video, and other multimedia content that depicts results of executing the indications of the user actions on the source computer system). In some implementations, the visual recording of the desktop activity may be automatically presented on the destination computer system. In other implementations, the visual recording of the desktop activity may be presented responsive to a user input (e.g., a user clicking on a link to begin streaming the content or the user clicking on a link to playback the visual recording of the desktop activity). The flow continues at block 506.

It is determined whether the indications of the user actions are to be replicated on the destination computer system (block 506). In some implementations, collaboration session settings configured for the destination computer system may be accessed to determine whether the indications of the user actions are to be automatically replicated on the destination computer system. In some implementations, the user may indicate (e.g., by clicking an "apply actions" button whether the indications of the user actions are to be replicated on the destination computer system. In some implementations, lack of user input may indicate that the indications of the user actions should not be replicated on the destination computer system. In other implementations, the user may be required to specifically indicate (e.g., by clicking on a "do not apply actions" button) that the indications of the user actions should not be replicated on the destination computer system. If it is determined that the indications of the user actions are to be replicated on the destination computer system, the flow continues at block 508. Otherwise, the flow ends. It is noted that the indications of the user actions received at block 502 may be stored along with previously and subsequently received indications of the user actions to enable the user at the destination computer system to execute and replicate the indications of the user actions at a future date. In other implementations, the indications of the user actions may be discarded on determining that the indications of the user actions should not be replicated on the destination computer system. The indications of the user actions may be retrieved at a later date (e.g., from a server) when the user wishes to replicate the indications of the user actions on the destination computer system.

Content of the destination computer system that corresponds to content associated with the indications of the user actions is identified (block 508). In other words, a mapping between content of the source computer system associated with the indications of the user actions and corresponding content of the destination computer system is determined. In some implementations, the mapping between the content of the source computer system and the corresponding content of the destination computer system may be predefined (e.g., by the user at the destination computer system during a collaboration session initialization process) prior to receiving the visual recording of the desktop activity and the indications of the user actions. In another implementation, the user at the destination computer system may be prompted to identify the corresponding content of the destination computer system (e.g., provide a name and location of the corresponding content) after it is determined that the indications of the user actions should be replicated on the destination computer system. In another implementation, based on knowledge of the content of the source computer system associated with the indications of the user actions, a process running on the destination computer system may automatically identify the corresponding content of the destination computer system. The user at the destination computer system may be prompted to indicate whether the mapping identified by the process on the destination computer system is accurate and the user may change the mapping (if required). The flow continues at block 510.

Figure 6:
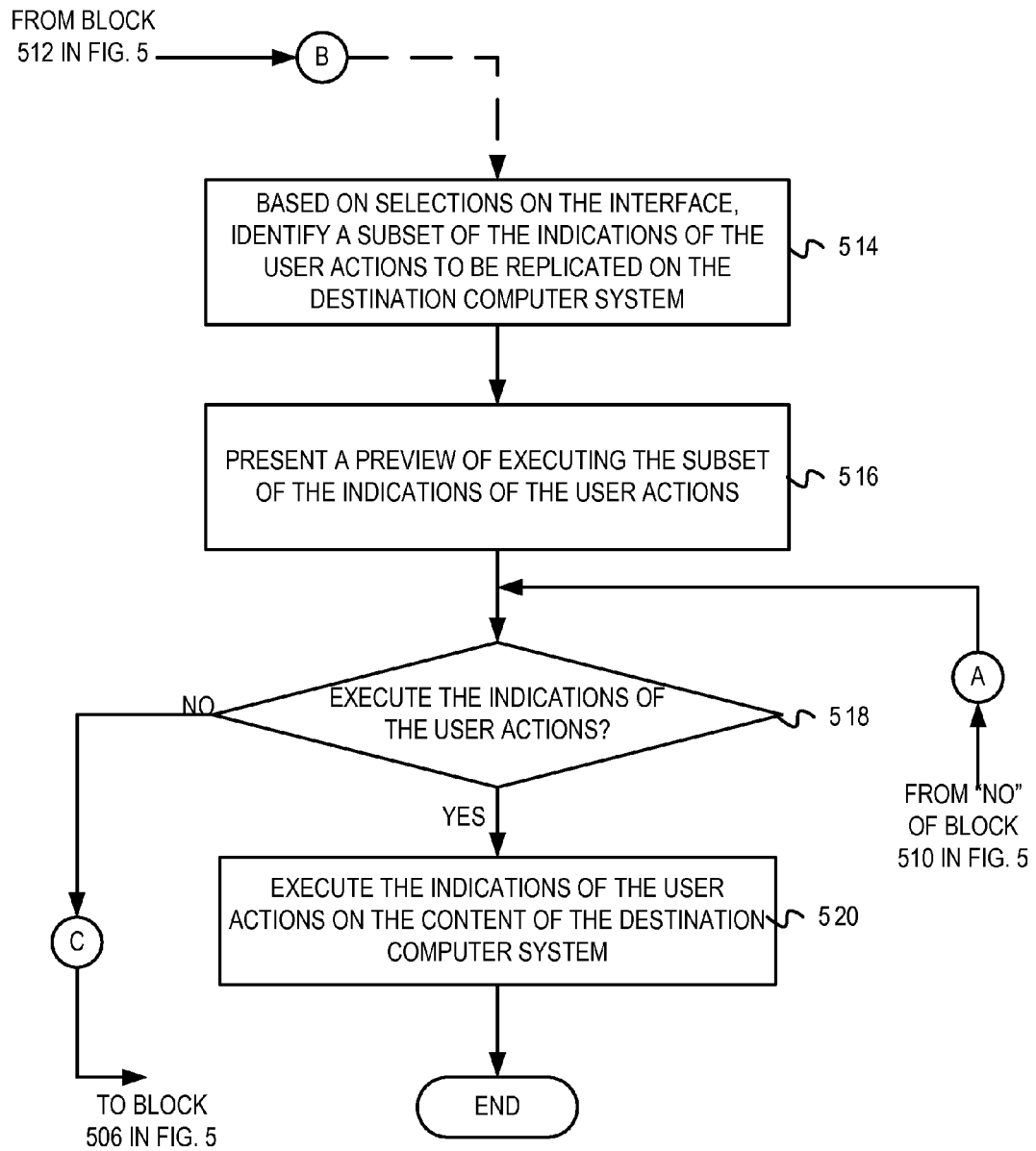
FIG. 6 illustrates the flow diagram illustrating example operations for replicating previously recorded actions on the computer system.

It is determined whether the indications of the user actions received from the source computer system are to be edited (block 510). Editing the indications of the user actions can involve selecting a subset of the indications of the user actions to be replicated on corresponding content of the destination computer system. As part of editing the indications of the user actions, content for which to replicate the indications of the user actions on the destination computer system may be identified. For example, indications of the user actions associated with folder AA and folder BB may be received at block 502. The indications of the user actions can be edited to specify that only the indications of the user actions associated with the folder AA should be replicated on the destination computer system. In some implementations, the user at the destination computer system may choose not to edit the indications of the user actions and may instead choose to replicate all or none of the indications of the user actions on the destination computer system. As part of editing the indications of the user actions, a time interval during which to replicate the indications of the user actions on the destination computer system may be identified. For example, it may be indicated that only the indications of the user actions that were recorded during a specified 15-minute interval should be replicated on the destination computer system. In some implementations, the user at the destination computer system may also have the option of editing a recorded actions log that comprises the indications of the user actions (e.g., adding/deleting/Docket modifying the instructions and system calls, etc.) If it is determined that the indications of the user actions are to be edited, the flow continues at block 512. Otherwise, the flow continues at block 520 in FIG. 6.

An interface for editing the indications of the user actions is presented on the destination computer system (block 512). The actions editing interface 308 of FIG. 3 is an example interface for editing the indications of the user actions. The interface enables the user at the destination computer system to select a subset of the indications of the user actions to be replicated on the destination computer system. The user can do so, as described above, by selecting content for which the indications of the user actions should be replicated on the destination computer system. The interface also enables the user at the destination computer system to select the subset of the indications of the user actions to be replicated by specifying a time interval during which the indications of the user actions are to be replicated on the destination computer system. The flow continues at block 514 in FIG. 6.

Based on the selections on the interface, a subset of the indications of the user actions to be replicated on the destination computer system are identified (block 514). For example, based on the time interval specified at block 512, the subset of the indications of the user actions that were executed (on the source computer system) during the specified time interval may be selected for replication on the destination computer system. For example, indications of the user actions within a 30-minute time interval may be available for replication on the destination computer system. The user at the destination computer system may indicate that the indications of the user actions within a specified 5-minute time interval should be replicated on the destination computer system. Accordingly, the subset of the indications of the user actions that lie within the specified time interval may be selected. As another example, based on the selections on the interface, the subset of the indications of the user actions that were executed (on the source computer system) on content specified at block 512 may be identified. For example, it may be determined that indications of the user actions that were executed on a word processing application, a software programming editor, and an instant messaging application are available for replication on the destination computer system. The user at the destination computer system may indicate that only the indications of the actions associated with the word processing application should be replicated on the destination computer system. Accordingly, the subset of the indications of the user actions associated with the word processing application may be selected. The flow continues at block 516.

A preview of executing the subset of the indications of the user actions is presented on the destination computer system (block 516). Based on knowledge of the subset of the indications of the user actions that should be replicated, the preview of executing the subset of the indications of the user actions can be generated. The preview can comprise a set of frames that are associated with the subset of the user actions to be executed on the destination computer system. Frame(s) of the visual recording of the desktop activity (received at block 502) that are associated with the subset of the indications of the user actions can be identified. For example, based on knowledge that indications of user actions associated with the word processing application should be replicated on the destination computer system, metadata of the visual recording of the desktop activity may be analyzed to determine frames of the visual recording of the desktop activity where the word processing application is in the foreground. If it is determined that the word processing application is in the foreground in frames 10-20 of the received content stream, the preview may be generated from the frames 10-20. The flow continues at block 518.

It is determined whether the subset of the indications of the user actions should be executed on content of the destination computer system (block 518). The user at the destination computer system can analyze the preview of executing the subset of the indications of the user actions (presented at block 516) and determine whether the subset of the indications of the user actions should be executed on appropriate content of the destination computer system. If it is determined that the subset of the indications of the user actions should be executed on the appropriate content of the destination computer system, the flow continues at block 520. Otherwise, the flow loops back to block 506 in FIG. 5. The user at the destination computer system can further edit the indications of the user actions, replicate all of the indications of the user actions, select a different subset of the indications of the user actions, or not replicate any of the indications of the user actions on the destination computer system. It is noted that the flow 500 also moves from the block 510 in FIG. 5 to block 518 if it is determined that the indications of the user actions should not be edited. The user at the destination computer system can indicate that the indications of the user actions should be replicated on the destination computer system or select a subset of the indications of the actions to be replicated on the destination computer system.

The indications of the user actions are executed on the content of the destination computer system (block 516). Previously configured mapping between the content of the source computer system and the corresponding content of the destination computer system (determined at block 508) may be accessed to identify the content of the destination computer system on which the indications of the user actions should be executed. System calls to an operating system of the destination computer system may be generated to execute the indications of the user actions on the content of the destination computer system. From block 516, the flow ends.

It should be noted that the operations described in the flow diagrams are examples meant to aid in understanding embodiments, and should not be used to limit embodiments or limit scope of the claims. Embodiments may perform additional operations, fewer operations, operations in a different order, operations in parallel, and some operations differently. For example, although FIGS. 1-6 depict the participant indicating the mapping between content of the presenter computer system 102 (or the source computer system) and corresponding content of the participant computer system 114 (or the destination computer system), embodiments are not so limited. In some implementations, the mapping between content of the presenter computer system 102 and the corresponding content of the participant computer system 114 could be determined when an application is launched on the presenter computer system 102. In some implementations, after the mapping between the content of the presenter computer system 102 and the corresponding content of the participant computer system 114 is established, the participant may move, delete, and/or edit the content of the participant computer system 114. Thus, system calls generated by the action editing and replicating unit 126 based on the old mapping may result in the operating system's inability to execute one or more of the indications of the presenter actions. Therefore, in some implementations, prior to generating the system call, the action editing and replicating unit 126 may ensure that the mapping between the content of the presenter computer system 102 and the corresponding content of the participant computer system 114 is still valid. If the action editing and replicating unit 126 determines that the old mapping is no longer valid, the action editing and replicating unit 126 may prompt the participant to reconfigure the old mapping. Alternately, the action editing and replicating unit 126 may automatically search the participant computer system 114 and identify a new mapping.

Also, although FIGS. 1-6 depict the presenter specifying content for which to record indications of presenter actions during a collaboration session initialization process (e.g., prior to recording the indications of presenter actions), embodiments are not so limited. For example, the presenter may launch a new application mid way through the collaboration session. The collaborative sharing unit 104 of the presenter computer system 102 may detect launching of the new application and may prompt the presenter to indicate whether indications of the presenter actions associated with the new application should be recorded and be provided to other participants in the collaboration session. In some implementations, the presenter may modify the collaboration session settings 106 during the collaboration session. For example, the presenter may initially indicate that indications of presenter actions associated with a word processing application should be recorded and be provided to the other participants of the collaboration session. At a later time during the collaboration session, the presenter may determine that the indications of the presenter actions associated with the word processing application should no longer be recorded and should not be provided to the other participants of the collaboration session. Accordingly, the presenter may change the collaboration session settings and indicate that subsequent indications of the presenter actions associated with the word processing application should no longer be recorded.

As described above, the indications of the presenter actions may be stored on the server. In some implementations, the indications of the presenter actions may be downloaded (at a later date) by the participant for replication of the indications of the presenter actions on corresponding content of the participant computer system 114. The participant may also have an option of downloading (from a server) or receiving (from the presenter computer system 102) indications of the presenter actions associated only with specified content. For example, the collaborative sharing unit 104 of the presenter computer system 102 may indicate content for which the indications of the presenter actions will be provided to the collaborative sharing unit 116 of the participant computer system 114. Accordingly, the collaborative sharing unit 116 can indicate to the collaborative sharing unit 104 (based on participant input) specific content for which the indications of the presenter actions should be provided. For example, with reference to FIG. 1, the collaborative sharing unit 104 may specify that indications of the presenter actions associated with the project folder 204 and the photo editing application 206 will be provided to the collaborative sharing unit 116. Based on participant input, the collaborative sharing unit 116 may communicate, to the collaborative sharing unit 104, that only the indications of the presenter actions associated with the project folder 204 are required by the participant computer system 114. Accordingly, the collaborative sharing unit 104 may record and/or provide the indications of the presenter actions associated with the project folder 204 to the participant computer system 114.

Finally, it is also noted that in some implementations, the participant computer system 114 and the presenter computer system 102 may implement different operating systems. For example, the presenter computer system 102 may implement a Windows® operating system while the participant computer system 114 may implement a Unix® operating system. The indications of the user actions as determined by the presenter computer system 102 may be in the form of system calls to the Windows operating system. The action editing and replicating unit 126 of the participant computer system 114 may implement functionality to map the system calls to the Windows operating system to corresponding system calls to the Unix operating system of the participant computer system 114.

Figure 7:
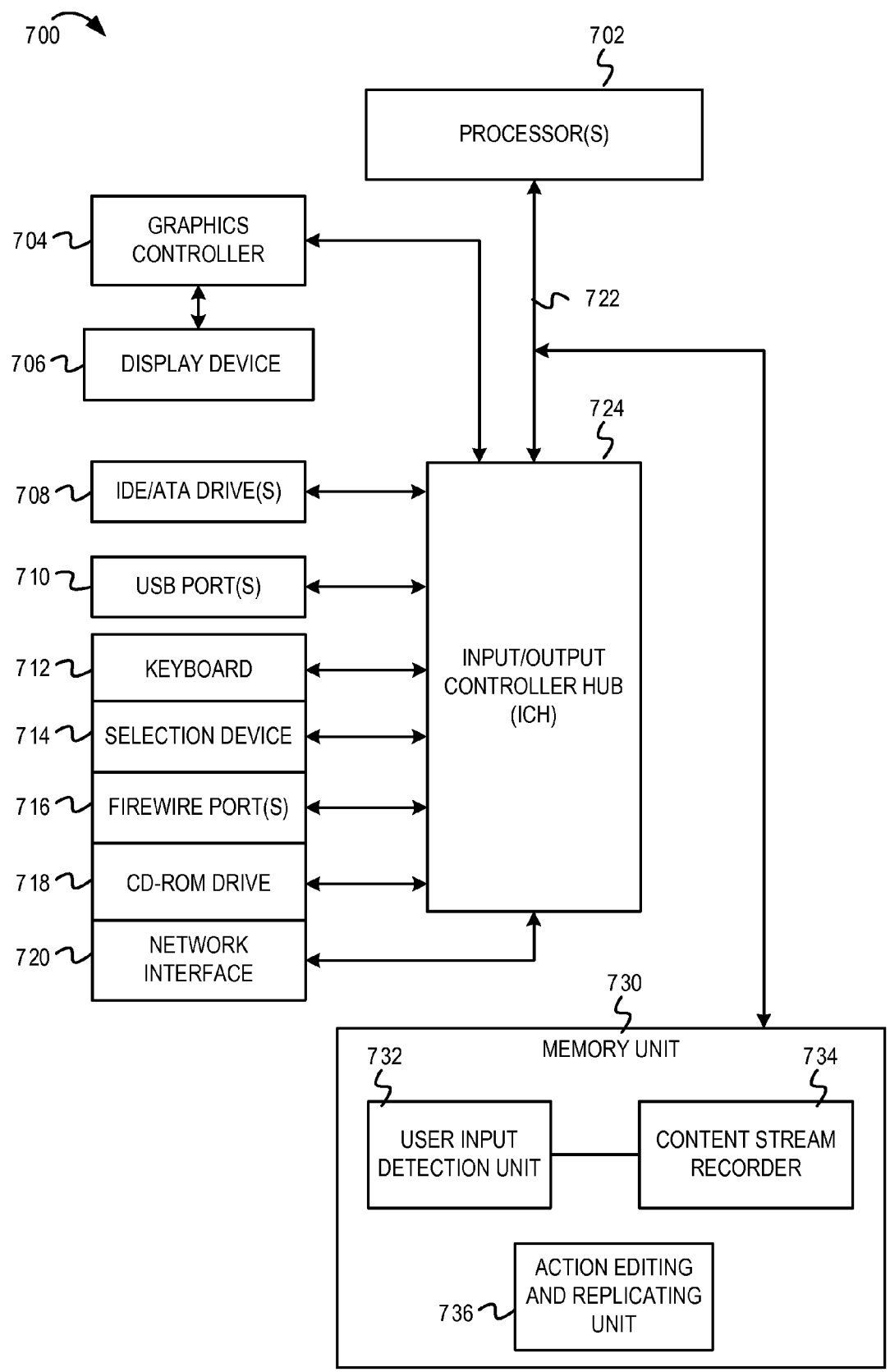
FIG. 7 is an example computer system configured for recording and replicating indications of user actions in a collaborative environment.

FIG. 7 is an example computer system configured for recording and replicating indications of the user actions in a collaborative environment. The computer system 700 includes a processor 702. The processor 702 is connected to an input/output controller hub 724 (ICH), also known as a south bridge, via a bus 722 (e.g., PCI, ISA, PCI-Express, HyperTransport, etc). A memory unit 730 interfaces with the processor 702 and the ICH 724. The main memory unit 730 can include any suitable random access memory (RAM), such as static RAM, dynamic RAM, synchronous dynamic RAM, extended data output RAM, etc The memory unit 730 comprises a user input detection unit 732, a content stream recorder 734, and an action editing and replicating unit 736. The user input detection unit 732 is coupled with the content stream recorder 734. The user input detection unit 732 records indications of actions executed on content presented by the computer system 700. The content stream recorder 734 generates a visual recording of activity presented on a desktop of the computer system 700 and provides a composite stream comprising the recorded indications of actions and the visual recording of the desktop activity to other computer systems. It is noted that in some implementations, the content stream recorder 734 may provide a first stream comprising the visual recording of the desktop activity while the user input detection unit 732 may provide a second stream comprising the recorded indications of actions to the other computer systems. The action editing and replicating unit 736 receives indications of recorded user actions and visual recording of the desktop activity (from another computer system) and enables replication of some/all of the indications of the user actions. The action editing and replicating unit 736 presents an interface for editing the indications of the user actions and for selecting a subset of the indications of the user actions to be replicated on corresponding content of the computer system 700 as was described with reference to FIGS. 1-6.

The ICH 724 connects and controls peripheral devices. In FIG. 7, the ICH 724 is connected to IDE/ATA drives 708, universal serial bus (USB) ports 710, a keyboard 712, a selection device 714, firewire ports 716, CD-ROM drive 718, and a network interface 720. The ICH 724 can also be connected to a graphics controller 704. The graphics controller is connected to a display device 706 (e.g., monitor). In some embodiments, the computer system 700 can include additional devices and/or more than one of each component shown in FIG. 7 (e.g., video cards, audio cards, peripheral devices, etc.). For example, in some instances, the computer system 700 may include multiple processors, multiple cores, multiple external CPU's. In other instances, components may be integrated or subdivided. Any one of these functionalities may be partially (or entirely) implemented in hardware and/or on the processor 702. For example, the functionality may be implemented with an application specific integrated circuit, in logic implemented in the processor 702, in a co-processor on a peripheral device or card, etc.

Figure 8:
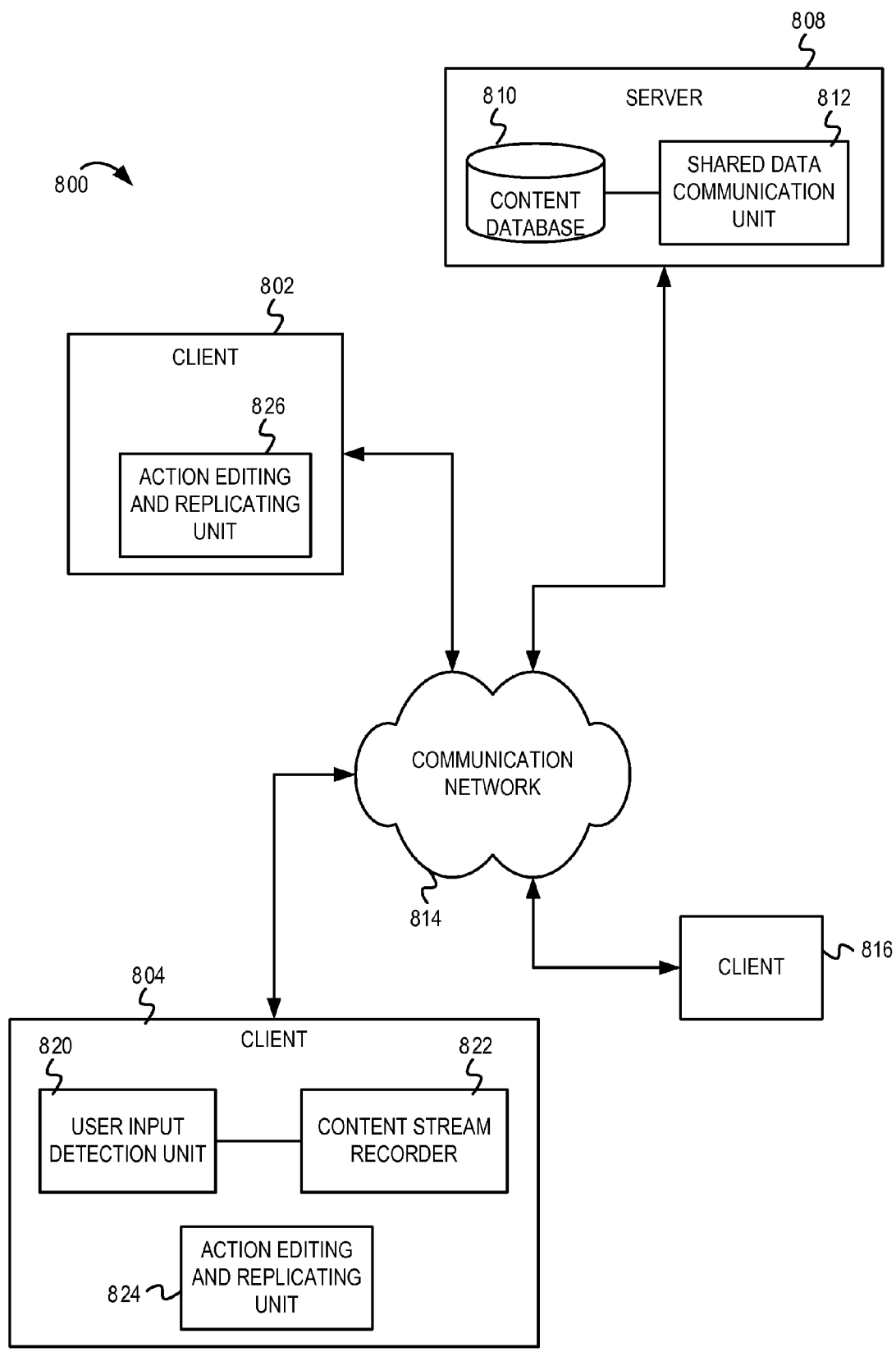
FIG. 8 is an example block diagram configured for recording and replicating indications of user actions in a collaborative environment.

FIG. 8 is an example block diagram configured for recording and replicating indications of user actions in a collaborative environment. The system 800 comprises a server 808 and clients 802, 804, and 816. The server 808 comprises a content database 810 and a shared data communication unit 812. The client 804 comprises a user input detection unit 820, a content stream recorder 822, and an action editing and replicating unit 824. The user input detection unit 820 is coupled with the content stream recorder 822. The client 802 comprises an action editing and replication unit 826 in addition to a user input detection unit (not shown) and a content stream recorder (not shown). The clients 802, 804, and 816 may be embodied as the computer system 700 of FIG. 7.

The clients 802, 804, and 816 participate in a collaborative session via the server 808. For example, the clients 802, 804, and 816 can be part of an online conference. When a client designated as a presenter in the collaborative session (e.g., the client 804) executes an action (e.g., types a key on a keyboard, clicks a mouse button, speaks a voice command, etc.) on content presented by the client 804, the user input detection unit 820 records an indication of the action (e.g., an operating system call). The content stream recorder 822 generates a visual recording of desktop activity being presented by the client 804. The client 804 provides the visual recording of the desktop activity and the indications of the actions to the server 808 via a communication network 814. It is noted that the client 804 may record and/or may provide only a subset of the indications of the actions to the server depending on configured collaboration session settings (as described in FIG. 1). The shared data communication unit 812 on the server 808 receives and stores the visual recording of the desktop activity and the indications of the actions in the content database 810 to enable access to the visual recording of the desktop activity and the indications of the actions at a later date. The shared data communication unit 812 can also identify other participants in the collaborative session (e.g., the clients 802 and 816) and can provide the visual recording of the desktop activity and the indications of the actions to the clients 802 and 816. In some implementations, the shared data communication unit 812 can determine whether the other clients 802 and 816 have elected to receive the indications of the actions. Although the shared data communication unit 812 may continuously provide the visual recording of the desktop activity to the clients 802 and 816, the shared data communication unit 812 may not provide the indications of the actions unless requested by the clients 802 and 816.

On receiving the visual recording of the desktop activity and the indications of the actions, the client 802 can present the visual recording of the desktop activity. The action editing and replicating unit 826 of the client 802 presents an interface to enable selection of at least a subset of the indications of the actions to be replicated on corresponding content of the client 802. The action editing and replicating unit 826 can select a subset of frames of the visual recording of the desktop activity that are associated with the subset of the indications of the actions to be replicated on the client 802. The action editing and replicating unit 826 can generate a preview of executing the subset of the indications of the actions on the client 802. The action editing and replicating unit 826 also identifies content of the client 802 that corresponds to content of the client 804 to enable proper execution of the subset of the indications of the actions on the client 802. The action editing and replicating unit 826 generates operating system calls to enable execution of the subset of the indications of the actions on appropriate content of the client 802.

The server 808 and the clients 802, 804, and 816 communicate via the communication network 814. The communication network 814 can include any technology (e.g., Ethernet, IEEE 802.11n, SONET, etc) suitable for passing communication between the server 808 and the clients 802, 804, and 816. Moreover, the communication network 814 can be part of other networks, such as cellular telephone networks, public-switched telephone networks (PSTN), cable television networks, etc. Additionally, the server 808 and the clients 802, 804, and 816 can be any suitable devices capable of executing software in accordance with the embodiments described herein. The shared data communication unit 812 on the server 808 may be implemented as a chip, plug-in, code in memory, etc.

It is also noted that although FIGS. 1-8 refer to replicating actions across computer systems, embodiments are not so limited. In some implementations, any suitable electronic devices (e.g., mobile phones connected via a cellular, wireless, or satellite network) may implement functionality for replicating actions as described herein. Moreover, the computer systems may also be virtual computer systems including thin clients connected via a local area network (LAN), virtualized computer systems in a cloud computing environment, etc.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for replicating recorded actions across computer systems in a collaborative environment as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving, at a first computer system in a collaborative environment, a plurality of indications of actions executed on content of a second computer system in the collaborative environment, wherein each of the plurality of indications of actions indicates a user input action, a function, and one of an application and an operating system at the second computer system that calls the function responsive to the user input action;
determining, at the first computer system, a mapping between the content of the second computer system and corresponding content of the first computer system;
identifying, at the first computer system, a subset of the plurality of indications of the actions executed on the content of the second computer system that are to be executed on the corresponding content of the first computer system;
presenting, on the first computer system, a preview of executing the subset of the plurality of indications of the actions on the corresponding content of the first computer system; and
executing, at the first computer system, the subset of the plurality of indications of the actions on the corresponding content of the first computer system.

2. The method of claim 1, further comprising:
receiving, at the first computer system, a recording of activity presented on a desktop of the second computer system that indicates at least executing the plurality of indications of the actions on the content of the second computer system.

3. The method of claim 1, wherein said determining the mapping between the content of the second computer system and the corresponding content of the first computer system further comprises:
determining a property associated with the content of the second computer system;
identifying the corresponding content of the first computer system based on the property associated with the content of the second computer system; and
associating a location of the content of the second computer system with a second location of the corresponding content of the first computer system.

4. The method of claim 1, wherein said identifying the subset of the plurality of indications of the actions executed on the content of the second computer system that are to be executed on the corresponding content of the first computer system further comprises at least one of:
determining the subset of the plurality of indications of the actions to be executed on the corresponding content of the first computer system based on determining a time interval that comprises the subset of the plurality of indications of the actions, and
determining the subset of the plurality of indications of the actions to be executed on the corresponding content of the first computer system based on determining a subset of the content of the second computer system with which the subset of the plurality of indications of the actions are associated.

5. The method of claim 1, further comprising:
identifying a subset of a plurality of frames that constitute a recording of activity presented on a desktop of the second computer system and that correspond to the subset of the plurality of indications of the actions that are to be executed on the corresponding content of the first computer system, wherein the recording of the activity presented on the desktop of the second computer system indicates at least executing the plurality of indications of the actions on the content of the second computer system;

generating the preview of executing the subset of the plurality of indications of the actions from the identified subset of the plurality of frames that constitute the recording of activity presented on a desktop of the second computer system and that correspond to the subset of the plurality of indications of the actions that are to be executed on the corresponding content of the first computer system.

6. The method of claim 1, wherein said executing the subset of the plurality of indications of the actions on the corresponding content of the first computer system further comprises:

generating a plurality of system calls associated with corresponding each of the subset of the plurality of indications of the actions; and providing the plurality of system calls to an operating system of the first computer system.

7. The method of claim 1, wherein a first of the plurality of indications of the actions comprises a system call directed to an operating system of the second computer system for executing the first of the plurality of indications of the actions on the content of the second computer system.

8. The method of claim 1, further comprising:

recording, at the first computer system, a second plurality of indications of actions executed on a second content of the first computer system and activity presented on a desktop of the first computer system that indicates at least executing the second plurality of indications of the actions on the second content;

providing, to the second computer system, the recording of the activity presented on the desktop of the first computer system and at least a subset of the second plurality of indications of the actions.

9. A method comprising:

receiving, at a first client, a plurality of indications of actions for selecting a subset of files presented by a second client and a recording of activity presented on a desktop of the second client indicating at least executing the plurality of indications of the actions for selecting the subset of files presented by the second client, wherein each of the plurality of indications of actions indicates a user input action, a system call, and one of an application and an operating system at the second client that calls the function responsive to the user input action;

determining, at the first client, that at least a subset of the plurality of indications of actions for selecting the subset of files presented by the second client are to be executed on corresponding files of the first client;

identifying, at the first client, the at least the subset of the plurality of indications of the actions that are to be executed on the corresponding files of the first client;

synchronizing the first client with the second client to determine the corresponding files of the first client that corresponds to the subset of files presented by the second client; and executing, at the first client, the at least the subset of the plurality of indications of the actions to select the corresponding files of the first client.

10. The method of claim 9, further comprising:

generating a preview of executing the at least the subset of the plurality of indications of the actions on the corresponding files of the first client based, at least in part, on the recording of activity presented on the desktop of the second client and the at least the subset of the plurality of indications of the actions; and presenting the preview on the first client.

11. The method of claim 9, wherein said synchronizing the first client with the second client further comprises associating a location of the subset of files presented by the second client with a second location of the corresponding files of the first client.

12. The method of claim 9, wherein the first client and the second client comprise a collaborative environment.

13. A computer program product for replicating recorded actions across computer systems in a collaborative environment, the computer program product comprising:

non-transitory storage medium having computer readable program code embodied therewith, the computer readable program code to, receive, at a first computer system in the collaborative environment, a plurality of indications of actions executed on content of a second computer system in the collaborative environment, wherein each of the plurality of indications of actions indicates a user input action, a function, and one of an application and an operating system at the second computer system that calls the function responsive to the user input action and presenting, on the first computer system, a preview of executing the subset of the plurality of indications of the actions on the corresponding content of the first computer system that calls the function responsive to the user input action;

determine, at the first computer system, a mapping between the content of the second computer system and corresponding content of the first computer system;

identify, at the first computer system, a subset of the plurality of indications of the actions executed on the content of the second computer system that are to be executed on the corresponding content of the first computer system;

present, on the first computer system, a preview of executing the subset of the plurality of indications of the actions on the corresponding content of the first computer system;

and execute, on the first computer system, the subset of the plurality of indications of the actions on the corresponding content of the first computer system.

14. The computer program product of claim 13, wherein the computer readable program code configured to determine the mapping between the content of the second computer system and the corresponding content of the first computer system further comprises the computer readable program code configured to:

determine a property associated with the content of the second computer system;

identify the corresponding content of the first computer system based on the property associated with the content of the second computer system; and associate a location of the content of the second computer system with a second location of the corresponding content of the first computer system.

15. The computer program product of claim 13, wherein the computer readable program code configured to identify the subset of the plurality of indications of the actions executed on the content of the second computer system that are to be executed on the corresponding content of the first computer system further comprises at least one of:

the computer readable program code configured to determine the subset of the plurality of indications of the actions to be executed on the corresponding content of the first computer system based on the computer readable program code determining a time interval that comprises the subset of the plurality of indications of the actions, and the computer readable program code configured to determine the subset of the plurality of indications of the actions to be executed on the corresponding content of the first computer system based on the computer readable program code determining a subset of the content of the second computer system with which the subset of the plurality of indications of the actions are associated.

16. The computer program product of claim 13, wherein the computer readable program code is further configured to:

identify a subset of a plurality of frames that constitute a recording of activity presented on a desktop of the second computer system and that correspond to the subset of the plurality of indications of the actions that are to be executed on the corresponding content of the first computer system, wherein the recording of the activity presented on the desktop of the second computer system indicates at least executing the plurality of indications of the actions on the content of the second computer system;

generate the preview of executing the subset of the plurality of indications of the actions from the identified subset of the plurality of frames that constitute the recording of activity presented on a desktop of the second computer system and that correspond to the subset of the plurality of indications of the actions that are to be executed on the corresponding content of the first computer system.

17. The computer program product of claim 13, wherein the computer readable program code configured to execute the subset of the plurality of indications of the actions on the corresponding content of the first computer system further comprises the computer readable program code configured to:

generate a plurality of system calls associated with corresponding each of the subset of the plurality of indications of the actions; and provide the plurality of system calls to an operating system of the first computer system.

18. A system comprising:

a processor;

a network interface coupled with the processor, the network interface operable to receive a plurality of indications of actions executed on content of a second system in a collaborative environment that at least comprises the system and the second system, wherein each of the plurality of indications of action indicates a user input action, a function and one of an application and an operating system at the second computer system that calls the function responsive to the user input action; and an action editing and replicating unit operable to, via the processor, determine a mapping between the content of the second system and corresponding content of the system;

identify a subset of the plurality of indications of the actions executed on the content of the second system that are to be executed on the corresponding content of the system;

present, on the system, a preview of executing the subset of the plurality of indications of the actions on the corresponding content of the first computer system; and execute the subset of the plurality of indications of the actions on the corresponding content of the system.

19. The apparatus of claim 18, further comprising:

a user input detection unit operable to:

record, at the system, a second plurality of indications of actions executed on a second content of the system; and a content stream recorder operable to:

record, at the system, activity presented on a desktop of the system that indicates at least executing the second plurality of indications of the actions on the second content; and provide, to the second system, the recording of the activity presented on the desktop of the system and at least a subset of the second plurality of indications of the actions.

20. The apparatus of claim 18, wherein the action editing and replicating unit, the user input detection unit, and the content stream recorder comprise computer readable storage media.

* * * * *